Dec. 27, 1955   C. H. ANESHANSLEY   2,728,491
LIQUID DISPENSERS
Filed March 22, 1952

INVENTOR
CLAY H. ANESHANSLEY

BY *Carl Beust*

*Justin S. Compton*

HIS ATTORNEYS

United States Patent Office 2,728,491
Patented Dec. 27, 1955

2,728,491

LIQUID DISPENSERS

Clay H. Aneshansley, Fort Loramie, Ohio, assignor to The National Cash Register Company, Dayton, Ohio, a corporation of Maryland Application March 22, 1952, Serial No. 278,006

5 Claims. (Cl. 222—158)

This invention relates to a device for dispensing measured quantities of liquids, and more particularly pertains to a flexible-walled liquid container having, on the upper inside wall thereof, an upwardly opening measuring cup and a delivery tube extending from the interior of said cup to the outside of the container, the container being otherwise closed. The cup may be filled with liquid contained in the bottle by inverting it and returning it to an upright position, whereby the liquid as measured in the cup may be expelled through the delivery tube by squeezing the container.

The invention also provides for the adjustment of the various components so that the quantity of the liquid dispensed may be selectively varied.

In the preferred form of the invention the container is a flexible bottle having a normally upright position and a top opening, said opening being closed by a screw cap having a seal through which the delivery tube passes. The internal measuring cup is positioned against the upper inside wall of the bottle and the cup is filled by tilting the bottle and returning it to an upright position. Upon squeezing the bottle, the contents of the cup, insofar as they are reached by the tube, are expelled through the tube, which may be bent so as to permit the delivery end of the tube to be inserted into a beaker or other receptor.

The outside wall of the container may be semi-transparent and marked by graduations in the area of the cup, indicating the amount of fluid contained in the cup, so that in the event the cup is not full, the amount of liquid therein can be readily determined. The delivery tube itself is marked where it passes through the seal in the cap, the marks being graduations determining the amount which will be delivered if the bottle is squeezed until the expulsion capacity is used up. The expulsion capacity, of course, can be no greater than is determined by the depth with which the tube is inserted into the measuring cup and this, in turn, depends upon the length of tube permitted to be left within the container.

With these and incidental objects in view, the invention includes certain novel features of construction and combinations of parts, a preferred form or embodiment of which is hereinafter described with reference to the drawings which accompany and form a part of this specification.

Figure 1:
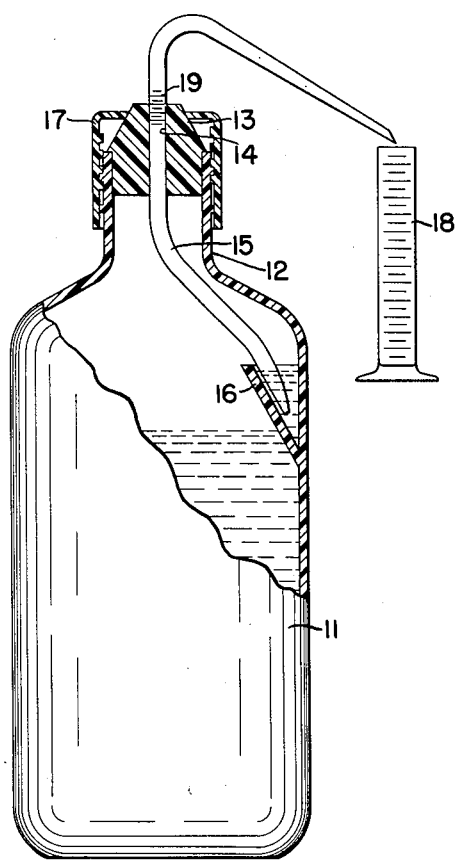
Fig. 1 is an elevation of the container with certain sections broken away to show the inside cup and the method of passing the delivery tube through the cap-seal.

In the preferred embodiment, the main body 11 of the container is made of flexible thermo-plastic material, such as poly-ethylene or equivalent, which is flexible, liquid-proof and semi-transparent. The top of the container ends in a neck 12, equipped with external screw threads. The opening in the neck of the bottle is equipped with a resilient plug 13, having a central bore 14, through which passes a delivery tube 15, the lower end of which tube is inserted into a measuring cup 16, secured to or integral with the upper wall of the container 11. To form a perfect air-tight seal, a cap 17 is provided with internal threads so that it may be screwed onto the external threads on the neck of the bottle. The upper end of the plug 13 is conical and fits through a hole in the top of the cap 17 so that as the screw cap is screwed down onto the plug 13, a pressure seal is made with the delivery tube 15. Upon unscrewing the cap, the delivery tube 15 may be moved up and down within the hole in the plug, due to the release of pressure thereon, and it may be adjusted so that the lower end of the tube within the cup may be positioned to reach to the bottom of the cup or positioned higher in the cup. The upper end of the delivery tube, that is to say, the external end, may be bent over so as to deliver expelled liquids into a receptor such as beaker 18. It will be apparent that the maximum capacity of the cup determines the maximum amount deliverable from the tube by squeezing the bottle, that by raising the end of the delivery tube up toward the mouth of the cup, the maximum amount deliverable will be decreased, and that the volume delivered may be estimated according to the marks 19, placed on the delivery tube, as judged with respect to the top of the plug.

Figure 2:
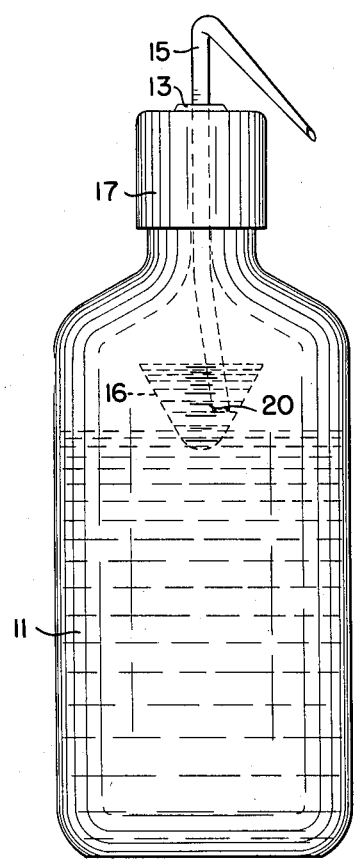
Fig. 2 is an elevation of the container of Fig. 1 turned approximately 90 degrees on a vertical axis, the elevation being without the breaks shown in Fig. 1.

As shown in Fig. 2, marks may be made on the outside of the bottle opposite the cup, as indicated at 20, to determine the volume deliverable according to the position of the delivery tube with reference thereto and with reference to the height within the cup to which liquid stands, as determined by viewing the liquid through the semi-transparent material of which the container is made.

In operation, the seal 17 and plug 13 are removed and the container filled with the desired liquid to a point short of the mouth of the cup, after which the plug and seal are replaced, making sure that the inner end of the delivery tube 15 is within the cup 16. Before secrewing down seal 17 the delivery tube 15 is adjusted within the plug 13 so that the cup end of the delivery tube is at the desired height to deliver the desired amount. The bottle is then tilted from the upright position shown in Fig. 1, so that the liquid will flow into cup 16, after which the bottle is set upright in such a manner that the liquid will stay in cup 16. The bottle is then squeezed until the escape of air from the delivery tube shows that the measured amount of liquid has been delivered through the tube 15. The same procedure is gone through again if it is desired to again deliver the same quantity. The tube 15 may be adjusted to deliver any desired quantity up to the capacity of the cup.

Other flexible and resilient material than the poly-ethylene named may be used for the container and any suitable resilient material may be used for the parts 13 and 17, although it is preferred that poly-ethylene be used for those components. The tube 15 also may be of poly-ethylene or any other material with which tubes may be made.

It is not necessary that the bottle material be translucent or transparent, for it may be made of other material, such as resilient opaque rubber, or even metal. Neither does the container have to be bottle-shaped, but may be of any shape which is convenient for the use to which it is to be put.

While the form of the invention herein shown and described is admirably adapted to fulfill the objects primarily stated, it is to be understood that it is not intended to confine the invention to the one form or embodiment herein disclosed, for it is susceptible of embodiment in various other forms.

What is claimed is:

1. A device for dispensing measured quantities of liquid, including, in combination, a flexible-walled single-chamber liquid container having a normally upright position and having on the interior wall thereof a measuring cup, the mouth of which cup opens upwardly when the container is in normal upright position and said mouth being above the maximum intended liquid level in the main body of the container when the container is in normal upright position; and a delivery tube extending from the inside of said cup to the outside of the container, and forming the only liquid or atmospheric outlet therefrom, whereby the container, if it has a supply of liquid in the main body thereof, may be tilted to fill the cup with liquid, and squeezed, after being returned to normal upright position to deliver the cup-held fluid through the tube to the outside of the container.

2. The device of claim 1, in which the delivery tube extends to the bottom of the cup whereby the emptying of the cup, when full, by squeezing the container, will deliver the contents of the cup through the tube.

3. The device of claim 1, wherein the delivery tube may be adjusted up or down, with respect to the bottom of the cup, to adjust the amount of liquid deliverable from the cup through said tube.

4. The device of claim 3, wherein measuring marks are placed on the wall of the cup to indicate the volume of liquid the cup contains at different levels.

5. The device of claim 3, wherein measuring marks are arranged along the tube where it leaves the container, and wherein the tube may be adjusted in and out of the container, controlling the length remaining within the cup which can be measured by said marks on the tube.

References Cited in the file of this patent

UNITED STATES PATENTS

| | | |
|---|---|---|
| 386,418 | Wherry et al. | July 17, 1888 |
| 490,493 | Olmstead | Jan. 24, 1893 |
| 494,467 | Donathen | Mar. 28, 1893 |
| 889,203 | Clifton | June 2, 1908 |
| 890,018 | Burt | June 9, 1908 |
| 941,489 | Beverly | Nov. 30, 1909 |
| 941,905 | Bajon | Nov. 30, 1909 |
| 2,094,539 | Jewett | Sept. 28, 1937 |
| 2,349,894 | Wells | May 30, 1944 |
| 2,578,907 | Tupper | Dec. 18, 1951 |
| 2,599,446 | Greene | June 3, 1952 |
| 2,616,593 | Leibenhaut | Nov. 4, 1952 |